May 21, 1963 R. D. KRONING ETAL 3,090,835
INTERCEPTING TRUNK CIRCUIT
Filed Aug. 9, 1961
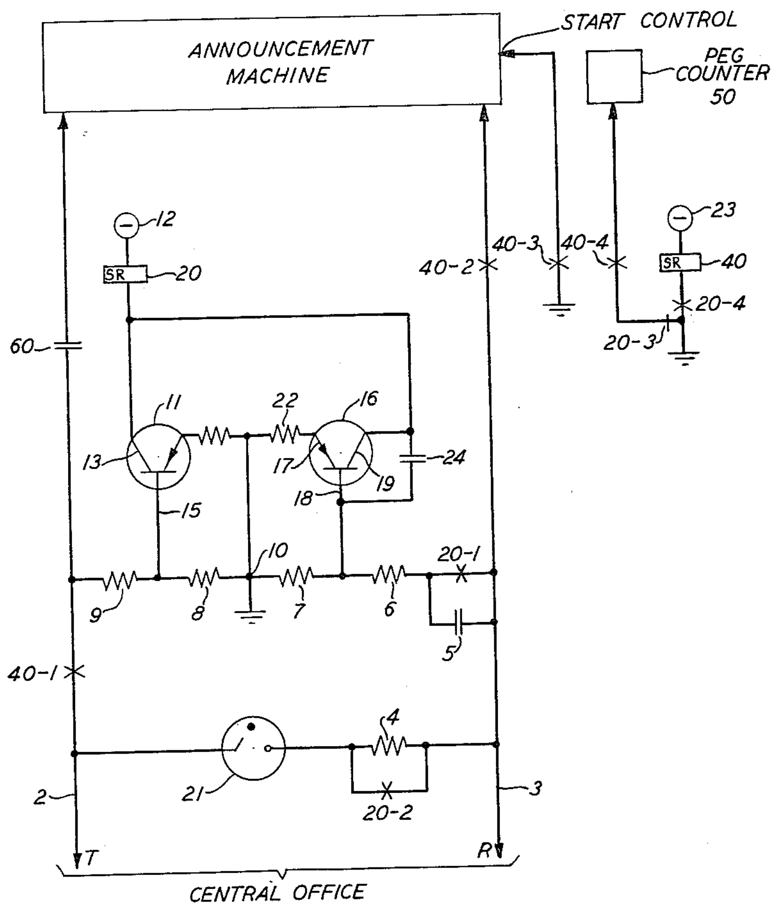
INVENTORS R. D. KRONING
J. OROST
BY
S E Hollander
ATTORNEY United States Patent Office 3,090,835 Patented May 21, 1963

3,090,835

INTERCEPTING TRUNK CIRCUIT

Robert D. Kroning, Wallington, and Joseph Orost, West End, N.J., assignors to Bell Telephone Laboratories, Incorporated, New York, N.Y., a corporation of New York Filed Aug. 9, 1961, Ser. No. 130,285
12 Claims. (Cl. 179—6)

This invention relates to automatic telephone announcement systems and, more particularly, to intercepting trunk circuits to be incorporated therein.

Automatic announcement machines of many different types and with various purposes are in widespread use in the telephone industry. A calling party often desires to be connected to such a machine; for example, when he calls to inquire as to the correct time of day or to receive a weather forecast. At other times he is quite unexpectedly connected to such an announcement machine. For example, if the called party is no longer served by the local central office dialed, an automatic announcement may be made to the calling party of this fact. In this latter situation the sequence of operations connecting the calling party to the announcement machine and automatically initiating the recording is termed in the telephone art "line intercept." In line intercept announcement systems the calling party dials all of the digits in the called party's telephone number before he is connected to the announcement machine.

Intercepting trunk circuits must be incorporated in these line intercept announcement systems. Upon the completion of the dialing of all digits in the called party's number, the calling party is connected to the intercepting trunk. It is the function of the intercepting trunk to connect the calling party to the announcement machine and to start the announcement. Numerous other functions that must be performed by this intercepting circuit will become apparent hereinbelow.

The needs of each local central office with regard to announcement machines and the associated trunks vary depending on the number of different announcements that must be recited and on the number of called parties for which they must be made.

Many prior art intercepting trunk circuits have incorporated complex and bulky equipment. This is a result of the numerous functions which must be performed by the intercepting trunk. For example, the trunk must respond to the ringing current in the line or a signal on the sleeve lead for seizing the announcement machine. The trunk must also be able to "trip" the ringing, that is, to provide the same condition as would be obtained by an individual called party going off-hook in response to the ringing. The trunk must further hold the circuit, that is, it must present a condition to the talking battery that is similar to the condition presented by an individual called subscriber. In addition, it must connect the announcement machine to the line link frame or equivalent terminals and start the recording. And often it must reduce the relatively large current that normally flows in response to the application of talking battery in order that the message charging relay in the central office will remain unenergized. This last function is necessary, for example, when the calling party is to be told that a wrong number has been dialed for which he should not be billed.

The resultant complexity and bulkiness of line intercepting trunk circuits is inconsonant with the flexibility required in local central offices. Very often line intercepting circuits must be moved from location to location to fulfill the requirements of various central offices. For this reason it is highly advantageous that these intercepting trunks be simple, compact, and lightweight.

Accordingly, it is an object of this invention to provide an intercepting trunk circuit that is inexpensive, compact, and lightweight.

In addition it is apparent that a most advantageous intercepting trunk circuit would be one capable of being incorporated in many different types of central offices such as No. 5 crossbar, step-by-step, etc.

It is another object of this invention to provide an intercepting trunk circuit than can serve many different types of local central offices.

Due to the variety of functions that must be performed by the line interceptingg trunk, prior art circuits have generally employed numerous relays of various types. For example, one relay might respond to the ringing current for seizing the circuit and a different relay might respond to talking battery for holding it. Many of the prior art circuits require an additional relay for counting purposes, this relay providing a pulse to step a peg counter to indicate the number of times the particular intercepting trunk has been employed. The counter operated by this relay is necessary, for example, to determine whether the particular trunk circuits available are being employed in the most efficient manner.

It is another object of this invention to provide a line intercepting trunk circuit incorporating only one relay in addition to the peg counter relay, this relay responding to both ringing current and talking battery.

In announcement systems such as time and weather a plurality of calling parties are connected to a common bus in the recording machine and hear the same announcement. For this reason it is desirable that when an announcement is being played to a group of calling parties, a subsequent calling party be connected to the common bus without interferring with the announcement in progress. Specifically, the ringing must be tripped before each calling party is connected to the common bus in order that the prior parties shall not be subjected to the ringing tones. Were the announcement machine seized by the silent interval battery and the last calling party connected to the bus at this time the subsequent ringing (superimposed on the silent interval battery) would interfere with the announcement. The necessary delays required to preclude this sequence of operations is generally provided by additional relays in prior intercepting trunk circuits.

It is thus seen that the one relay in addition to the peg counter relay in the line intercepting trunk circuit of our invention must not seize the announcement machine when silent interval battery is applied while it must hold the circuit in response to the talking battery which is often of the same polarity and magnitude.

It is another object of this invention to provide in a line intercepting trunk circuit the necessary sequence of operations for minimum interference between calling parties by the utilization of only the peg counter relay and the one additional relay specified above.

It is another object of this invention to provide a line intercepting circuit incorporating a relay which is responsive to talking battery and not to silent interval battery.

The line intercepting trunk circuit must seize the announcement machine in response to the ringing current and must hold it for as long as talking battery is applied. Prior intercepting trunk circuits have often incorporated relays responsive to both alternating and direct currents, these relays often requiring more than one winding or additional circuit elements.

It is another object of this invention to provide a line intercepting trunk circuit incorporating, in addition to a peg counter relay, a single relay with a single winding responsive to direct current only, yet operative in response to the alternating ringing current as well as the direct talking battery.

Although ringing current is applied to the ring conductor in the lines employed in almost all types of central offices, the same is not true of the talking battery. The talking battery is sometimes, although less often, applied to the tip conductor rather than to the ring conductor. In order that an intercepting trunk circuit be operative in conjunction with many different types of central offices, it should hold the circuit responsive to talking battery on either conductor.

It is another object of this invention to provide an intercepting trunk circuit that can be held by talking battery applied to either the tip or ring conductor.

Prior art intercepting trunk circuits employed with various telephone systems have often required the utilization of the sleeve lead having thereon various signal indications. For an intercepting trunk circuit to be generally usable with many different types of central offices, it is advantageous that the sleeve lead need not be employed.

It is, therefore, another object of this invention to provide an intercepting trunk circuit having all of the above-enumerated advantages and yet being connected to only the tip and ring conductors in all types of central offices with which it may be employed.

Briefly, in accordance with an aspect of this invention a transistor amplifier is connected across the tip and ring conductors in the intercepting trunk circuit. A capacitor is in series with the amplifier between the two conductors. Thus, the amplifier does not respond to silent interval battery. On the other hand, ringing current is not blocked by the capacitor and operates the amplifier. The amplifier is operated in class B, that is, the output in response to an alternating input signal is unipolar. This output is smoothed by a capacitor filter and operates the control relay associated with the intercepting trunk circuit. This relay performs numerous functions.

A first set of contacts on this relay shorts out a resistance that is in series with a gas tube, this series circuit being connected across the tip and ring conductors. The ringing potential causes the gas tube to break down and a large surge of current flows. This large current operates the tripping relay in the central office in the same manner as it does when an individual subscriber goes off-hook in response to the ringing. The ringing is tripped and talking battery is applied to the tip or ring conductor by the central office. The amplifier would normally not respond to this potential in the same manner that it remains unresponsive to the silent interval battery due to the incorporation of the capacitor in series with it between the tip and ring conductors. However, the control relay in response to its energization by the ringing current operates a second set of contacts which causes this series capacitor to be shorted out. Thus only after the ringing current has seized the circuit is the amplifier responsive to any direct current applied. The amplifier incorporates two transistors, each one responsive to talking battery on one of the tip and ring conductors. Thus, talking battery applied to either conductor operates the amplifier which maintains the energization of the control relay and holds the circuit.

It is necessary to delay the connection of the subscriber's tip and ring conductors to the announcement bus until after the ringing has been tripped. Thus, it is impractical for the control relay to provide this connection at the same time that it prepares the gas tube for tripping the ringing, for the ringing might interfere with other calling parties during the brief interval in which the tripping relay operates in response to the large surge of current. As in many intercepting trunk circuits a peg counter relay is employed. This relay in our invention is additionally utilized for providing the necessary delay between the break-down of the gas tube and the cessation of the ringing current at which time the calling party is connected to the announcement bus. The control relay in the intercepting trunk circuit energizes the peg counter relay. It is the peg counter relay that connects the calling party to the announcement machine. The operating time of this relay is greater or equal to that of the tripping relay in the central office and thus a connection is not completed until after the ringing has ceased.

It is a feature of this invention to provide amplifier means across the tip and ring conductors responsive to both alternating and direct currents for producing unipolar current to operate a control relay.

It is another feature of this invention to provide means for preventing the operation of the amplifier means by direct current in either of the tip and ring conductors until after the relay has been energized in response to alternating-ringing current in the ring conductor.

It is another feature of this invention to provide means for preventing the connection of a calling party to an announcement bus until after the tripping relay in the central office has operated and the ringing current has ceased.

Further objects, features, and advantages will become apparent upon consideration of the following description, taken in conjunction with the drawing, wherein the single FIGURE shows an illustrative embodiment of the invention.

Referring now to the drawing, the intercepting trunk circuit connects the line tip and ring conductors from the central office to the announcement machine bus. When the calling party is first connected to the intercepting trunk there is no closed path to the announcement bus for both sets of contacts 40–1 and 40–2, controlled by slow-release relay 40, are in the normal open condition.

When the calling party is first connected to the trunk either ringing current or silent interval battery is applied to ring conductor 3. Typically, the silent interval battery may be 48 volts of negative polarity while the superimposed alternating ringing current may be 85 volts in amplitude. If at first silent interval battery alone is applied, transistor 16 remains unenergized. Capacitor 5 blocks direct current and contacts 20–1, controlled by slow-release relay 20 are normally open. There is no path for direct current to flow from conductor 3 to the amplifying circuit. Thus, silent interval battery does not affect the trunk circuit.

If, on the other hand, ringing is first applied or when it is applied after the initial interval during which silent interval battery alone is applied, alternating current flows through capacitor 5 and resistors 6 and 7 to ground at terminal 10. Initially, emitter 17 is connected to ground through resistor 22. The negative potential of source 12 is applied to collector 19. The pnp transistor 16 is operated in class B, that is to say, a negative change in potential applied to the base 18 causes current to flow from collector 19 through the coil of relay 20 to source 12. Positive potential, on the other hand, applied to base 18 causes no current flow. Thus, effectively the alternating voltage appearing on the base 18 as a result of the voltage drop across resistor 7 causes a unipolar current to flow through the coil of relay 20. In the absence of capacitor 24 this current could have the appearance of a half-wave rectified sinusoid. Capacitor 24 filters the base-collector voltage and smoothes the collector current. Thus, the current flowing through the coil of relay 20 is unipolar as long as ringing current is applied. Ringing current thus causes control relay 20 to be operated.

The energization of control relay 20 by the ringing current has three effects on the trunk circuit. First, in closing normally open contacts 20–2 the ringing is tripped. Normally when a subscriber goes off-hook in response to the ringing signal a small impedance is placed across the tip and ring conductors. A large surge of current flows which energizes a tripping relay in the central office. This tripping relay then removes the ringing current and silent interval battery and, instead, applies talking battery to either the tip or ring conductor, depending on the particular kind of telephone system. An intercepting trunk circuit must automatically place a small resistance across the tip and ring conductors to simulate a subscriber going off-hook in order that the tripping relay be operated. However, the tripping relay should not be operated by a large surge of current during the application of the silent interval battery if this potential is applied before the ringing current. It is the ringing current that seizes the circuit by controlling relay 20 and, therefore, it is necessary to insure that ringing current is indeed applied before the tripping relay is operated. This is achieved by simulating the small impedance only after ringing current is applied.

Gas tube 21 is of the type which breaks down when the voltage across its anode and cathode terminals exceeds what is referred to as the breakdown potential. After breakdown the tube presents a small impedance to any current flowing therethrough. The tube is maintained in the breakdown condition for as long as the current through it exceeds a minimum value.

The breakdown potential of gas tube 21 is greater than the magnitude of either silent interval battery or talking battery. Thus, when the central office is first connected to the trunk circuit, not only does the amplifying circuit remain unenergized if silent interval battery is first applied but, in addition, gas tube 21 does not break down. The breakdown potential of the tube is less, however, than the maximum potential applied across the tip and ring conductors as a result of the superposition of the silent interval battery and the ringing potential. In an illustrative embodiment where the silent interval battery is 48 volts and the amplitude of the ringing potential is 85 volts, the breakdown potential of the gas tube 21 might be in the order of 75 volts.

According to an aspect of the invention a high impedance resistor is provided in series with the tube across the tip and ring conductors. This resistor is of sufficient value to materially limit the current that flows in the tube in response to the application of the ringing potential when first applied. This limited current is less than the minimum current required to operate the central office tripping relay. Consequently, the ringing potential when first applied ionizes the tube but does not cause the tube to enter its high conduction or breakdown condition and the tripping relay is not operated.

However, after the first few cycles of the ringing current energize control relay 20, contacts 20–2 close and short out resistance 4. The gas tube 21 is thus directly across conductors 2 and 3 and a large surge of current flows. This current energizes the tripping relay and silent interval battery and the ringing potential are removed in the central office from the tip and ring conductors.

At this time talking battery is applied to either the tip or ring conductor. This battery is utilized for maintaining the energization state of control relay 20 and to hold the circuit. In many telephone systems the talking battery is applied to the ring conductor. Although silent interval battery does not cause a current flow through resistors 6 and 7 talking battery does. This, the second effect of the operation of relay 20 on the circuit, is a result of the closing of normally open contacts 20–1. It is seen that after ringing current has energized relay 20 and contacts 20–1 close, a path now exists for direct current to flow from the ring conductor through resistors 6 and 7 to grounded terminal 10. This direct current operates transistor 16 and relay 20 remains energized. Relay 20 is a slow-release relay and thus does not become deenergized during the small interval between the removal of the ringing current and the application of the talking battery.

In certain other telephone systems talking battery is applied to the tip conductor 2. The energization of control relay 20 will be explained hereinbelow to cause normally open contacts 40–1 to close. When these contacts close, talking battery if applied to the tip conductor causes current flow through resistors 9 and 8 to grounded terminal 10. The potential drop across resistor 8 causes collector 13 current to flow through the coil of relay 20 to source 12. Again relay 20 is maintained energized and the circuit is held as long as talking battery is applied. The trunk circuit can thus be utilized in conjunction with systems wherein talking battery is applied to the ring conductor and with systems in which it is applied to the tip conductor.

It should be noted that there is no need for a filtering capacitor bridging the collector 13 and base 15 terminals of transistor 11 as there is with transistor 16. Capacitor 24 is utilized for smoothing the collector-base potential arising from the ringing current. Ringing current is not applied to the tip conductor in any of the telephone systems with which the present trunk circuit is utilized and thus there is no need for a capacitor analogous to capacitor 24 to filter the output current of transistor 11.

Capacitor 60 is provided to block the direct current from the talking battery from interfering with the announcement equipment.

It should be further noted that after the ringing current ceases and talking battery is applied, the gas tube 21 does not conduct even though contacts 20–2 are closed and resistor 4 is shorted. The tube ceases to conduct during the brief interval between the removal of the silent interval battery and ringing potential and the application of the talking battery. It cannot conduct once again when the latter voltage is applied for it is less than the breakdown potential.

Control relay 20, in addition to operating contacts 20–1 and contacts 20–2, opens normally closed contacts 20–3 and closes normally open contacts 20–4. The closing of these latter contacts, the third effect of the operation of relay 20 on the circuit, permits current flow from source 23 through the coil of slow-release relay 40 to ground. The resultant energization of relay 40 closes the four sets of contacts 40–1 through 40–4. The closing of the first two sets of contacts, 40–1 and 40–2, connects the tip and ring conductors to the announcement bus. The closing of contacts 40–3 grounds a control in the announcement machine which initiates the announcement in the event that it is not in progress due to the seizure of another trunk connected to the same bus. In addition, the start control pulse causes the announcement machine to continue functioning until ground is removed when contacts 40–3 open.

Contacts 40–1 and 40–2 are controlled by relay 40 rather than being controlled directly from relay 20. Relay 20, it has been seen, by closing contacts 20–2 permits the ringing to be tripped. It requires, however, a few milliseconds for this to occur, this time being the operating time of the tripping relay in the central office. Were contacts 40–1 and 40–2 to close at the same time as contacts 20–2 it is seen that the calling party would be connected to the machine bus immediately and the ringing potential would be applied to the bus for the short time interval required for the tripping relay to operate. This is undesirable as the ringing potential would interfere with an announcement in progress in the event that prior calling parties are connected to the bus. For this reason some delay is required before the calling party is connected to the machine bus. If the operating time of relay 40 is greater or equal to the operating time of the tripping relay, this delay is realized. Ringing ceases before the tip and ring conductors are connected to the common bus.

Control relay 20 has been described as being a slow-release relay in order that it not deenergize in the time interval between the removal of ringing current and the application of talking battery if the latter is applied to the ring conductor. In those offices in which talking battery is applied to the tip conductor there is an even greater time interval during which no current flows through relay 20 between the removal of the ringing current and the application of talking battery, this additional time being the operating time of relay 40 during which contacts 40–1 are open. The release time of relay 20 must, therefore, be greater than the operating time of relay 40.

A peg counter is often required to determine the number of times that the trunk has been seized. This is especially important in a portable announcement system where the announcement machines and the intercepting trunks are trasferred between many central offices in accordance with their relative requirements. These requirements are determined by a count of the number of times the various trunks have been used in each location.

The peg counter pulsing circuit is one well known in the art. When the trunk is seized and while it is being held, contacts 20–3 are open and contacts 40–4 are closed. When the calling party goes on-hook talking battery is removed from the tip or ring conductor. Consequently, no current flows in collector 13 or in the alternative from collector 19 and relay 20 deenergizes. The circuit is restored to its initial condition. Contacts 20–3 close. Contacts 20–4 open and relay 40 deenergizes. However, this relay has a slow-release characteristic and until it releases, contacts 40–4 remain closed. Thus, until relay 40 deenergizes, ground is connected through contacts 20–3, which close immediately, and contacts 40–4 to the peg counter. Ground is removed when relay 40 deenergizes and contacts 40–4 open. Thus a pulse is applied to peg counter 50 whose duration is equal to the release time of relay 40. This pulse steps the counter by one unit indicating that the trunk has been used one more time.

The circuit offers numerous advantages in addition to those enumerated above. One of these is the fact that resistors 6–9 may be of large or small magnitudes in accordance with the function of the announcement system. In many conventional intercepting circuits a relay is placed directly across the tip and ring conductors. The circuit is held as long as current flows through this relay, the current ceasing when talking battery is removed upon the calling party's going on-hook. It is necessary in many announcement systems that the calling party not be charged. A message charging relay is generally placed in one of the line conductors and the current caused to flow by the talking battery operates this relay. This current must be limited if the calling party is not to be billed, for example, where the announcement system functions to notify the calling party that the called party is no longer served by the local office. This is easily achieved in the instant invention by causing the combined series impedance of resistors 6–9 to be of large magnitude. The resulting current from the talking battery is insufficient to operate the message charging relay. In prior art circuits where a supervisory relay is connected directly across the tip and ring conductors, high resistance relay coils must be used with the consequent disadvantages of these relays, for example, the fact that they most often do not contain more than one set of contacts and thus additional relays must be used in conjunction with them if more than one set of contacts must be operated while the circuit is held. For those systems such as time and weather announcement machines where the subscriber is to be billed, the combined series resistance need merely be made small in magnitude.

It should be noted that in those announcement systems wherein it is not necessary to keep a record of the trunk usage the peg counter relay 40 may be omitted from the circuit. Contacts 40–1 and 40–2 may then be operated by relay 20, the delay necessary to provide for the tripping of the ringing prior to the connection of the calling line to the announcement bus being provided merely by making these contacts of the slow-to-operate type with relation to the remaining contacts operated by relay 20.

Although the invention has been described with a certain degree of particularity, it is understood that the present disclosure has been made only by way of example and that numerous changes in the combination and arrangement of components may be resorted to without departing from the spirit and scope of the invention.

What is claimed is:

1. An intercepting trunk circuit comprising first and second conductors, first amplifying means connected to said first conductor being initially operative in response only to alternating signals appearing in said first conductor, second amplifying means connected to said second conductor being initially unresponsive to all signals appearing in said second conductor, relay means connected to said first and second amplifying means responsive to the operation of either said first or second amplifying means, breakdown means connected across said first and second conductors for breaking down in response to the energization of said relay means by alternating signals appearing in said first conductor to present a low impedance to signals appearing in said first and second conductors, and means operative in response to the energization of said relay means by said alternating signals for controlling said first and second amplifying means to be responsive to direct current signals appearing in said first and second conductors, respectively.

2. An intercepting trunk circuit for connecting the tip and ring conductors in a telephone line to announcement machine comprising first and second conductors having respectively first and second normally open contacts connecting said tip and ring conductors to said machine, first amplifying means connected to said second conductor being initially operative in response only to alternating signals appearing in said second conductor, second amplifying means connected to said first conductor, first relay means connected to said first and second amplifying means responsive to the operation of either said first or second amplifying means, breakdown means connected across said first and second conductors for breaking down in response to the energization of said first relay means by alternating signals appearing in said second conductor to present a low impedance to signals appearing in said first and second conductors, means operative in response to the energization of said first relay means by said alternating signals for controlling said first amplifying means to be responsive to direct current signals appearing in said second conductor, and means including second relay means responsive to the energization of said first relay means for counting the number of times said first relay means is operated, said second relay means being operative for closing said first and second normally open contacts.

3. An intercepting trunk circuit for connecting the tip and ring conductors in a telephone line to an announcement machine comprising first and second conductors having first and second normally open contacts connecting said tip and ring conductors to said machine, first amplifying means connected to said second conductor being initially operative in response only to alternating signals appearing in said second conductor, second amplifying means connected to said first conductor, relay means connected to said first and second amplifying means responsive to the operation of either said first or second amplifying means, breakdown means connected across said first and second conductors for breaking down in response to the energization of said relay means by alternating signals appearing in said second conductor to present a low impedance to signals appearing in said first and second conductors, means operative in response to the energization of said relay means by said alternating signals for controlling said first amplifying means to be responsive to direct current signals appearing in said second conductor, and means responsive to the energization of said relay means for closing said first and second normally open contacts at a predetermined time after the energization of said relay means.

4. An intercepting trunk circuit for connecting the tip and ring conductors in a telephone line to an announcement machine comprising breakdown means connected between said tip and ring conductors; control means including relay means connected to said line responsive to ringing potential appearing in said ring conductor for controlling the operation of said breakdown means; a counter; means responsive to said control means for connecting said tip and ring conductors to said announcement machine after a predetermined delay for stepping the count of said counter and for operating said announcement machine; and means responsive to said control means for governing said control means to be responsive to direct current signals appearing in both of said tip and ring conductors.

5. An intercepting trunk circuit for connecting the tip and ring conductors in a telephone line to an announcement machine comprising first and second conductors having respectively first and second normally open contacts connecting said tip and ring conductors to said machine, first relay means, a reference potential, first and second transistors having respectively first and second base, emitter and collector terminals, said first and second base terminals being connected respectively to said tip and ring conductors, said first and second emitter terminals both being connected to said reference potential, said first and second collector terminals being connected to said first relay means, first capacitor means connected between said second base and collector terminals, a parallel circuit comprising a third conductor having third normally open contacts in shunt with second capacitor means connected between said second base terminal and said ring conductor, a counter, and second relay means responsive to the energization of said first relay means for operating said counter and for closing said first and second normally open contacts, said first relay means being additionally operative for closing said third contacts.

6. An intercepting trunk circuit in accordance with claim 5 further including a series circuit comprising resistance means and gas tube breakdown means connected between said tip and ring conductors and a shunt circuit including fourth normally open contacts connected across said resistance means, said contacts closing in response to the energization of said first relay means.

7. An intercepting trunk circuit for connecting the tip and ring conductors in a telephone line to an announcement machine comprising first and second conductors having respectively first and second normally open contacts connecting respectively said tip and ring conductors to said machine, amplifying means, a third conductor having third normally open contacts and capacitor means in shunt relationship with each other connecting said ring conductor to said amplifying means, first relay means connected to said amplifying means and operative in response to the transmission of alternating current through said ring conductor and said capacitor means to said amplifying means for closing said third contacts to allow transmission of direct current signals appearing in said second conductor to said amplifying means, second relay means operative in response to the energization of said first relay means for closing said first and second contacts, and impedance means having a low and a high state of conduction and operative in response to the energization of said first relay means and the appearance of alternating current signals in said ring conductor for presenting a low impedance to signals appearing in said tip and ring conductors.

8. An intercepting trunk circuit in accordance with claim 7 further including means connecting said first relay means to said first conductor and operative in response to the appearance of direct current signals in said tip conductor for energizing said first relay means.

9. An intercepting trunk circuit for connecting the tip and ring conductors in a telephone line to an announcement machie comprising breakdown means connected between said tip and ring conductors; control means including relay means connected to said line and responsive to ringing potential appearing in said ring conductor for controlling the operation of said breakdown means; and means responsive to said control means for connecting said tip and ring conductors to said announcement machine for initiating the operation of said announcement machine and for governing said control means to be responsive to direct current signals appearing in said line to maintain the connection of said tip and ring conductors to said announcement machine.

10. An automatic announcement machine for transmitting a prerecorded message along the tip and ring conductors of a telephone line comprising gas tube breakdown means and resistance means connected in series between said tip and ring conductors, first conductor means containing first normally open contacts shunting said resistance means, an announcement machine, second and third conductor means containing respectively second and third normally open contacts connecting respectively said tip and ring conductors to said announcement machine, amplifying means responsive to both alternating and direct signals, capacitor means connecting said ring conductor and said amplifying means, fourth conductor means containing fourth normally open contacts in shunt with said capacitor means, means including relay means connected to said amplifying means and operative in response to the application of alternating potential to said ring conductor for closing said first, second, third and fourth contacts, and means connecting said tip conductor to said relay means for enabling the energization of said relay means by direct current signals appearing in said tip conductor responsive to the closing of said second contacts.

11. An automatic announcement machine in accordance with claim 10 wherein said relay means is a slow-release relay and further including means for delaying the closing of said second and third contacts until all alternating signals in said ring conductor have subsided.

12. An intercepting trunk circuit for an automatic announcement system comprising a line having two conductors, amplifying means connected across said conductors operative in response to alternating current in said line, an announcement machine, means including relay means connected to said amplifying means for connecting said line to said announcement machine in response to the operation of said amplifying means, gas tube means connected across said conductors for conducting in response to the appearance of said alternating current in said line only after the operation of said relay means, and means controlled by said relay means for controlling said amplifier means to be operative in response to direct current appearing in either of said conductors.

No references cited.